United States Patent [19]
Hoyt

[11] 3,750,621
[45] Aug. 7, 1973

[54] ELBOW STEERING FORK FOR FISHING MOTORS

[76] Inventor: Leo C. Hoyt, 321 E. Minnesota, Indianapolis, Ind. 46225

[22] Filed: Nov. 1, 1971

[21] Appl. No.: 194,157

[52] U.S. Cl. .............................. 115/18 R, 74/515
[51] Int. Cl. ............................................. B53h 21/26
[58] Field of Search .................... 74/515; 115/18 R, 115/18 A

[56] References Cited
UNITED STATES PATENTS

| | | | |
|---|---|---|---|
| 2,826,088 | 3/1958 | Wittick | 74/515 |
| 2,543,490 | 2/1951 | England | 74/515 |
| 3,274,849 | 9/1966 | Hanson | 115/18 R |
| 3,371,641 | 3/1968 | Rohman et al. | 115/18 R |

*Primary Examiner*—Milton Buchler
*Assistant Examiner*—Stuart M. Goldstein

[57] ABSTRACT

An attachment secureable to an electric fishing motor so to permit a fisherman to have both hands free for casting or fishing while steering the boat, the device consisting of an adjustable extension attachable to either the electric motor handle end or which is attachable to the vertical shaft of the motor, the adjustable extension supporting a rake like fork having a series of upwardly extending, spaced apart tines between a selective ones of which a fisherman can place his elbow while steering.

2 Claims, 6 Drawing Figures

PATENTED AUG 7 1973 3,750,621
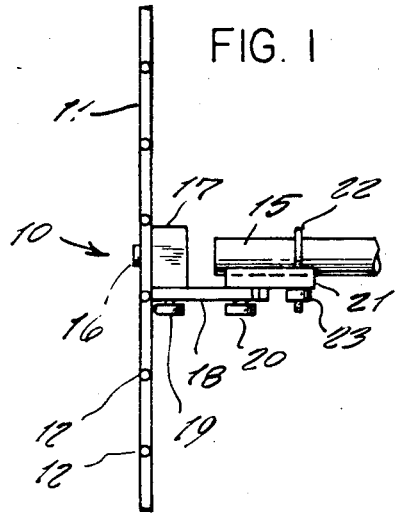
FIG. 1
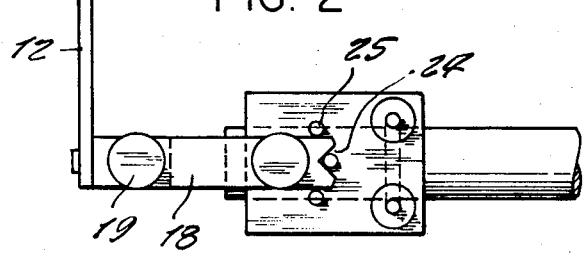
FIG. 2
FIG. 3
FIG. 4
FIG. 5
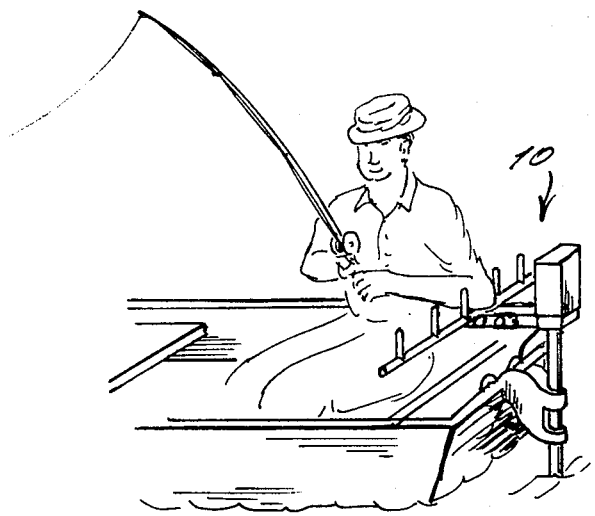
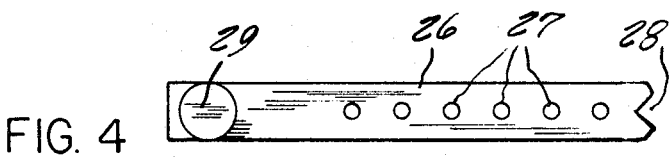
FIG. 6
INVENTOR.
LEO C. HOYT

ELBOW STEERING FORK FOR FISHING MOTORS

This invention relates generally to fisherman's accessories. More specifically it relates to electric motors.

It is generally well known to most fishermen who fish or troll from a moving boat that it is hard for them to handle a rod in casting or in fishing while at the same time trying to steer the boat. This situation is of course objectionable and therefore in want of improvement.

Accordingly it is the principal object of the present invention to provide an attachment for a fishing motor that can be steered by the fishermen's elbow thereby permitting the fishermen to have both his hands free for purposes of casting and fishing.

Another object of the present invention is to provide an elbow steering fork for fishing motors and which can be attached selectively either to the handle end of the electric fishing motor or else attached to the vertical motor shaft thereof.

Still another object of the present invention is to provie an elbow steering fork for fishing motors which includes an adjustable extension so that the elbow fork can be extended further away or closer to the motor handle.

Yet another object of the present invention is to provide an elbow steering fork for fishing motors that can be used by either right or left handed fishermen.

Still another object of the present invention is to provide an elbow steering fork for fishing motors that is designed especially for the low priced electric fishing motor but which alternately can be used with the much more expensive boat controls so to rest the feet.

Still another object of the present invention is to provide an elbow steering fork for fishing motors which can be mounted on either side of the gas motor in the stern, or alternately in the center of the stern, or alternately the motor maybe mounted on the gunwale or in the bow of the boat.

Other objects of the present invention are to provide an elbow steering fork for fishing motors which is simple in design, inexpensive to manufacture, rugged in construction, easy to use and efficient in operation.

These and other objects will be readily evident upon a study of the following specification and the accompanying drawing wherein:

FIG. 1 is a plan view of the present invention shown secured to the electric fishing motor handle end, FIG. 2 is an enlarged side elvation view thereof, FIG. 3 is a front elevation view thereof, FIG. 4 is a modified form of connecting member used there with, FIG. 5 is a perspective view of the present invention shown in operative use, and FIG. 6 is a fractional side elevation view of a modified form of the invention for the attachment to the vertical shaft of the electric fishing motor.

Referring now to the drawing in detail, and more particularly at this time to FIGS. 1, 2, 3 and 5, the reference numeral 10 represents an elbow steering fork for fishing motors according to the present invention wherein there is a one half inch diameter bar 11 made of aluminum material and which is approximately 20 inches in length, and upon which there are mounted a plurality of upwardly extending tines 12 each one of which is made likewise of aluminum and which is one quarter inch in diameter. The tines 12 are spaced approximately four and one quarter inches apart from each other. The upper end of the tines are rounded so as to be comfortable when touched by a fisherman's elbows or arm. The fork 10 is provided with screw threaded openings 13 near each opposite end of the bar 11 as well as a threaded opening 14 near its center; the threaded opening 13 permitting the device to be mounted on either side of a gas motor while the central opening 14 permits the same to be mounted centrally to the handle 15 of an electric fishing motor, as shown in FIGS. 1 and 5.

A screw 16 received either through openings 13 or 14 is attached to a block 17 to one end of a bar 18 by means of a screw 19. The opposite end of bar 18 is secured by means of screw 20 to a V-shaped cradle 21 attached by means of U-bolt 22 around the end of handle 15 and secured there to by means of threaded nuts 23.

As shown in FIG. 2 of the drawing, it is to be noted that the end of the bar 18 is provided with a V-shaped notch 24 for being selectively secured against either of three sidewardly extending dowels 25 so to permit the bar 18 and its supported fork to extend either horizontally as shown in FIG. 2 or else titled upwardly or tilted downwardly.

In FIG. 4 there is shown an adjustable extension 26 provided with a row of openings 27 there through either one of which may have the mounting screw 20 fitted there through and an adjacent of the openings being adaptable for receiving one of the dowels 25. Alternately a notch 28 on the end of the extension 26 is adaptable for engaging one of the dowels 25 while the end most opening 27 is adapted for receiving the mounting screw 20. The opposite end of the extension is provided with a mounting screw 29 and is attachable to the bar 18 so that the fork can be adjustably extended in distance from the end of the motor handle end 15.

Referring now to FIG. 6 of the drawing, there is shown a modified design of the invention which is adaptable for attachment to a vertical shaft 30 of the electric fishing motor 31 and wherein such motor is provided with a twist grip speed control handle 32 in this form of the invention, there are a pair of clamping plates 33 positioned on opposite sides of the vertical shaft 30 and which are clamped securely there to by means of a thumb screw 34 and the screw 35 that additionally secures the bar 18 or the extension 26 there to. Thus one of the plates 33 is additionally provided with the dowles 25 described above for the purpose already stated. Thus a modified securement is provided.

What I now claim is:

1. In an elbow steering fork for fishing motors, the combination of a rake-like fork unit comprised of a straight bar of light weight, strong material and which has a plurality of vertically upwardly extending tines secured thereto in spaced relation, the upper end of said tines being rounded, said tines permitting a fisherman to selectively place his elbow there between for steering a boat, said fork unit being secured to a block which in turn is secured upon a bar, said bar being selectively attachable directly to a cradle secured to a handle of said fishing motor, said cradle being secured by means of a U-bolt to said fishing motor handle, said cradle being provided with a threaded opening for receiving a mounting screw supporting said bar, and said cradle having a plurality of sidewardly extending dowels for being fitted into an end notch on said bar.

2. The combination as set forth in claim 1 further including an adjustable extension comprising a row of openings along the length thereof for selectively being secured to said cradle or bar so that said fork unit is at a desired distance from said fishing motor handle.

* * * * *